US005558925A

United States Patent [19]

Fritzman

[11] Patent Number: 5,558,925

[45] Date of Patent: Sep. 24, 1996

[54] WINDOW TREATMENT ARTICLE

[75] Inventor: Ralph Fritzman, Sarasota, Fla.

[73] Assignee: Cellular Designs Unlimited, Inc., Sarasota, Fla.

[21] Appl. No.: 388,270

[22] Filed: Feb. 13, 1995

[51] Int. Cl.$^{6}$ .............................. B32B 3/28; E06B 9/26; A47H 5/00

[52] U.S. Cl. .......................... 428/181; 428/121; 428/176; 428/178; 428/188; 160/166.1; 160/84.01

[58] Field of Search ............................ 428/34, 192, 181, 428/120, 121, 130, 174, 176, 178, 188, 198, 224; 156/107, 109; 160/84.1 R, 166.1

[56] References Cited

U.S. PATENT DOCUMENTS

| | | | |
|---|---|---|---|
| Re. 30,254 | 4/1980 | Rasmussen | 160/84 |
| 1,937,342 | 11/1933 | Higbie | 88/60 |
| 1,944,280 | 1/1934 | Snyder | 428/181 |
| 2,140,049 | 12/1938 | Grauel | 156/10 |
| 3,346,438 | 10/1967 | Chavannes | 428/178 |
| 3,384,519 | 5/1968 | Froget | 156/65 |
| 3,892,898 | 7/1975 | Yasui | 428/116 |
| 3,996,084 | 12/1976 | Holmes | 156/93 |
| 4,001,474 | 1/1977 | Hereth | 428/116 |
| 4,069,857 | 1/1978 | Brookshire | 160/84 |
| 4,108,698 | 8/1978 | Brookshire | 156/60 |
| 4,542,055 | 9/1985 | Fitzsimmons | 428/181 |
| 5,287,908 | 2/1994 | Hoffmann et al. | 160/121.1 |
| 5,313,999 | 5/1994 | Colson et al. | 160/121.1 |
| 5,392,832 | 2/1995 | Colson et al. | 160/84.07 |
| 5,394,922 | 3/1995 | Colson et al. | 160/121.1 |

FOREIGN PATENT DOCUMENTS

| | | |
|---|---|---|
| 1309194 | 10/1962 | France . |
| 3525515A1 | 7/1985 | Germany . |

*Primary Examiner*—Donald Loney
*Attorney, Agent, or Firm*—Holland & Knight

[57] ABSTRACT

A method and apparatus is provided for forming a window treatment article having opposed upper and lower sheets interconnected by transversely oriented, longitudinally spaced vanes comprising a pair of counter-rotating folding rollers oriented with respect to one another to form a nip therebetween, and a pusher bar assembly which is operative to successively advance a portion of the upper sheet into the nip between the folding rollers where it is folded and brought into contact with a lower sheet. The upper sheet is successively folded upon itself to form a number of transversely-extending, longitudinally-spaced vanes each having a fold line defining an inner end which is affixed to the lower sheet, and an opposite, outer end which is closed by adhesive attachment, an ultrasonic weld or other means of attachment, thus defining an essentially closed pocket having opposed sides within which a rectangular slat can be removably inserted to add overall rigidity to the finished article and to provide a decorative effect.

30 Claims, 7 Drawing Sheets

WINDOW TREATMENT ARTICLE

FIELD OF THE INVENTION

This invention is related to a method and apparatus for forming window treatment articles and, more particularly, to a method and apparatus for forming a window treatment article having opposed, generally planar sides separated by transversely extending fabric sections or vanes which are movable between an upright position generally perpendicular to the sides and a tilted position generally parallel to same.

BACKGROUND OF THE INVENTION

A variety of window treatment products have been developed in recent years including curtains, roller blinds, venetian blinds and expandable-collapsible articles. One type of expandable-collapsible product is a zig-zag or accordion-folded article comprising a series of interconnected pleats such as disclosed, for example, in U.S. Pat. Nos. 4,181,070; 3,921,432 and 4,012,932. Another type of construction is the so-called "honeycomb" or cellular structure wherein selected folded portions of one or more sheet materials are interconnected by adhesive or other means of attachment to form side-by-side elongated hollow channels. Patents illustrative of honeycomb-type expandable-collapsible products include U.S. Pat. Nos. 4,603,072; 4,631,108; 4,685,986; 4,631,217; 4,676,855; 4,677,012; and 4,677,013.

A more recent development has involved an attempt to combine aspects of expandable-collapsible articles with a construction resembling a venetian blind. One example of this construction is disclosed in U.S. Pat. No. 5,287,908 directed to a window assembly which includes first and second generally parallel, spaced, longitudinally extending sheer fabrics which form the inner and outer sides of the window covering. A plurality of longitudinally spaced sections of fabric or "vanes" are affixed between the first and second sheer fabrics to form the completed assembly. Preferably, the vanes are oriented parallel to one another and extend transversely across the width of the fabric sheets from edge to edge.

The sheer fabrics are typically constructed of a translucent or transparent material such as fabric, non-woven fabric or sheets of plastic material, and the vanes are preferably opaque or semi-opaque, By adjusting the relative positions of the sheer fabrics, the vanes are caused to tilt relative to one another in a manner similar to the slats of a venetian blind. In an "open" position, the vanes are oriented parallel to one another and generally perpendicular to each of the two sheets so that only an edge of each vane can be seen when viewing the sheets from the front or back of the window covering. When one of the sheets or sheer fabrics is moved relative to the other, the vanes tilt to a closed position substantially parallel to the sheer fabrics and overlap or at least abut one another in the transverse direction. In this position, the entire window covering can be wound about a wind-up roll at the top of the window covering assembly to completely expose the window.

One problem with window coverings of the type disclosed in U.S. Pat. No. 5,287,908 is that a difficult fabrication problem is presented in affixing the vanes to the sheer fabrics. Each transversely extending edge of each vane must be separately glued or otherwise affixed to the adjacent sheer fabric in order to form a connection therebetween. Given the flimsy nature of the sheer fabrics and the material forming the vanes, it is difficult to efficiently and rapidly align the transverse edges of each vane with respect to the sheer fabrics, apply a bead of glue or other means of connection thereto and then press the fabric sheets and vanes together to achieve a bond therebetween. Consequently, the rate at which such articles can be produced is relatively low, and the cost of the finished article is high.

SUMMARY OF THE INVENTION

It is therefore among the objectives of this invention to provide a method and apparatus for forming a window covering formed from two sheets of material such as fabric or non-woven material having a plurality of longitudinally spaced vanes extending therebetween, which is comparatively easy to fabricate, which is economical, which can present aesthetically different appearances and which is adapted for use with different types of window roll-up hardware.

These objectives are accomplished in a method and apparatus for forming a window treatment article having opposed upper and lower sheets interconnected by transversely oriented, longitudinally spaced vanes comprising a pair of counter-rotating folding rollers oriented with respect to one another to form a nip therebetween, and a pusher bar assembly which is operative to successively advance a portion of the upper sheet into the nip between the folding rollers where it is folded and brought into contact with a lower sheet. The upper sheet is successively folded upon itself to form a number of transversely-extending, longitudinally-spaced vanes each having a fold line defining an inner end which is affixed to the lower sheet, and an opposite, outer end which is closed by adhesive attachment, an ultrasonic weld or other means of attachment. Each vane therefore forms an essentially closed pocket having opposed sides within which a rectangular slat can be removably inserted to add overall rigidity to the finished article and to provide a decorative effect.

An important objective of the method and apparatus of this invention is to provide a more efficient and economical means of fabricating a window treatment article of the general type disclosed in U.S. Pat. No. 5,287,908 described above. Unlike the '908 patent, the window treatment article of this invention is formed from only two sheets of material, and the method of forming and attaching the vane portion of the article is greatly simplified.

In the presently preferred embodiment, the pusher bar is formed with an upper gripper member and a lower gripper member each carrying a spring-biased clamping arm. At least one of the gripper members is movable toward and away from the other so that the upper sheet can be gripped between the clamping arms. The upper sheet is fed between the folding rollers, noted above, in a position overlying the lower sheet which is advanced through the folding rollers independently of the upper sheet, i.e. the upper and lower gripper members of the pusher bar do not engage or otherwise affect the movement of the lower sheet. The pusher bar and folding rollers cooperate to successively fold a portion of the upper sheet upon itself thus forming the longitudinally-spaced vanes noted above. Substantially planar connector sections are formed along the upper sheet, in between the longitudinally spaced vanes, so as to provide the appearance of an essentially continuous surface wherein the outer connector sections either abut one another or are slightly overlapped to form a pleated look.

The sequence of the folding operation for the upper sheet proceeds as follows. With the upper sheet initially engaged between the counter-rotating, folding rollers, the pusher bar is moved to a contact or pick-up position upstream from the rollers. The gripper members are then moved toward one another so that the upper sheet is frictionally engaged between the clamping arms of each gripper member. The pusher bar is advanced by linear actuators, described below, toward the nip between the folding rollers so that the portion of the upper sheet between the gripper members and folding rollers is bowed or looped in the general shape of an inverted "S". When viewed in a vertical plane, this inverted S shape forms a top bow or loop portion and a bottom bow or loop portion wherein the top loop "leads," i.e., is located downstream, closer to the folding rollers, than the bottom loop. The top loop of the inverted S shape is advanced by the gripper members and guided toward the roller nip by a guide plate to a release position where the top loop can be engaged by the rollers. At this time, the rollers are rotated relative to one another, while the upper and lower gripper members are separated and begin to retract from the roller nip and move upstream. The top loop of the inverted S shape of the upper sheet is drawn between the rollers to form a fold line therealong, and the rollers continue rotating until the upper sheet is advanced therethrough to a position where the bottom loop of the aforementioned S shape is located immediately upstream from the nip of the rollers.

As noted above, while the rollers are rotating, the pusher bar is retracted to the pick-up position spaced from the rollers. After the rollers stop rotating, the upper and lower gripper members are first moved toward one another so that their clamping arms contact the upper sheet, and then the gripper members are advanced toward the folding rollers in the same manner described above. That is, a second inverted S shape is formed in the upper sheet having top and bottom loop portions just like the initial inverted S shape. The top loop of this second or successive inverted S shape is inserted by the clamping arms of the upper and lower grippers into the nip between the folding rollers immediately above and slightly downstream from the bottom loop of the first inverted S shape. When the rollers are again activated, while the upper and lower gripper members release the upper sheet, the top loop of the newly formed inverted S shape is folded and the bottom loop of the previously formed inverted S shape is folded at or about the same time. The rollers continue to rotate, while the pusher bar moves back to the pick-up position spaced from the rollers, until such time as the upper sheet is advanced to a position wherein the bottom loop of the just formed S shape in the upper sheet is located immediately upstream from the folding rollers. The sequence is then continued as before.

The above-described folding sequence, wherein the upper sheet is successively folded upon itself, forms a series of longitudinally spaced vanes in the finished window treatment article separated by "connector sections," i.e., sections of the upper sheet which are approximately equal in length to the distance between the top and bottom loops of each inverted S shape. Each vane is defined by successive folded-over portions of the upper sheet. The fold line formed along the top loop of one inverted S shape defines the outer end of that vane, and the fold line formed along the bottom loop of the same inverted S shape defines the inner end of such vane. Each vane therefore has first and second sides because the upper sheet is folded over on itself between the top and bottom loops of each inverted S shape.

In order to form the completed window treatment article, the upper sheet must be affixed to itself in the area of the outer end of each vane, and the inner end of each vane must be affixed to the lower sheet, Preferably, one bead of adhesive is applied at longitudinally spaced intervals on the upwardly facing surface of the upper sheet, while a second bead of adhesive is applied at longitudinally-spaced intervals along the opposite or downwardly facing surface of the upper sheet. These beads of adhesive are located such that when the vanes of the upper sheet are formed, one bead of adhesive is located along the inner edge of each vane, i.e. along the fold line formed therealong, and another adhesive bead is located at the opposite, outer end of such vane.

In the course of movement of the upper and lower sheets through the folding rollers, which are preferably heated, the adhesive bead along the inner edge of each vane is forced into engagement with the facing surface of the lower sheet thus forming an adhesive bond therebetween which interconnects the upper and lower sheets. Additionally, the adhesive bead along the outer edge of each vane is forced against a facing surface of an adjacent connector section of the upper sheet to enclose each vane. In one embodiment, adjacent connector sections of the upper sheet abut one another in which case the adhesive bead along the outer edge of each vane is located so that the outer edges of the vane interconnect with one another. In an alternative embodiment, wherein the outer edge of the vane overlaps an adjacent connector section, the overlapping portion of the vane carries the adhesive bead and is adhered to a portion of the adjacent connector section to form a pleated look. In either instance, each vane is closed at opposite ends thus forming a pocket or space between the opposed sides thereof.

The above-described article is useful in the fabrication of window covering assemblies of the general type disclosed in the aforementioned U.S. Pat. No. 5,287,908. When placed in a header assembly such as disclosed in the '908 patent, or other types of take-up assemblies, the article of this invention functions in a manner similar to a venetian blind. That is, the vanes extending between the opposed surfaces of the article can be made to shift between an open position wherein the vanes are oriented transversely to such surfaces, and a closed position wherein the vanes are oriented generally parallel to such surfaces. Preferably, the materials forming the upper and lower sheets are translucent to allow the passage of light therethrough. Nevertheless, because the vanes are formed by folding over a portion of the upper sheet upon itself, when the vanes are in the closed position a lesser amount of light is permitted to pass therethrough compared to when the vanes are in the open position. In a manner described in the '908 patent, the entire article can be raised and lowered with respect to a window, if desired.

Another important advantage of this invention is the versatility in looks which can be achieved due to the construction of the vanes. As described above, each of the vanes is formed by folding over a portion of the upper sheet upon itself thus defining two sections or portions of material located side-by-side which extend across the width of the article. These side sections of each vane are joined along a fold line at the inner edge thereof, and interconnected along the outer edge by a bead of adhesive or the like in the manner described above. A "pocket" is thus formed by each vane which is shaped to receive a generally rectangular slat, preferably formed of plastic or lightweight metal which is insertable between the side sections of each vane from either end thereof along the entire width of the sheets. These slats can be formed of different colors so that when the vanes are moved to a closed position, generally parallel to the inner and outer faces of the article, the color of the slats carried by each vane is visible from the front or back of the article. This provides a decorative look to the window treatment assembly formed with the article of this invention, which can be readily changed by simply replacing the slats of one color with slats of another color. In this way, the overall color of the article of this invention can be altered to match different furnishings, wall-coverings, drapes or other changes in the appearance of a particular room without necessitating replacement of the entire window covering assembly. Additionally, the slats add overall rigidity to the assembly and can be employed to assist in raising and lowering the article between a fully extended and fully retracted position.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
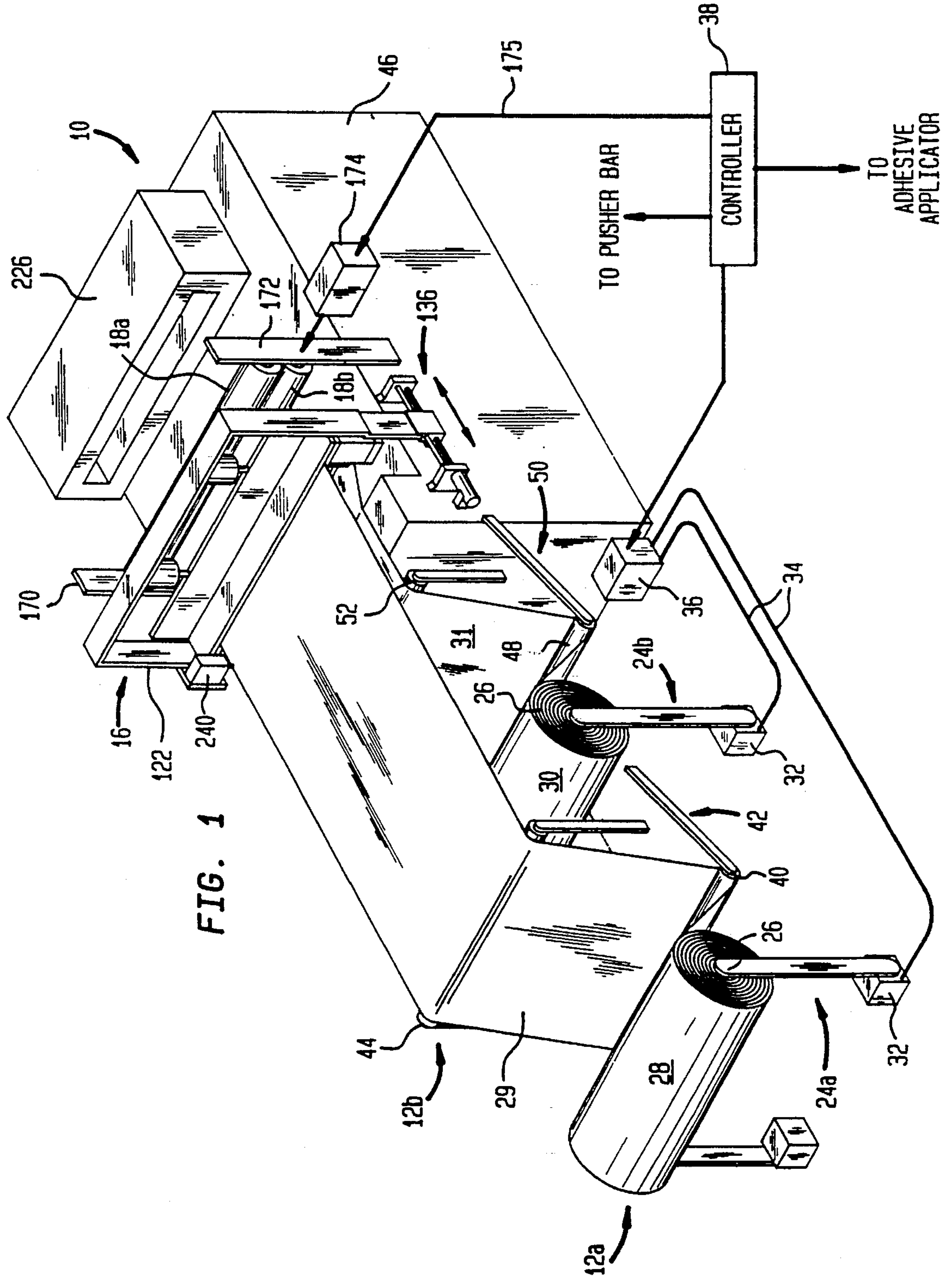
FIG. 1 is an overall perspective view of the apparatus of this invention including an upper sheet and a lower sheet supplied from a pair of webs.
Figure 2:
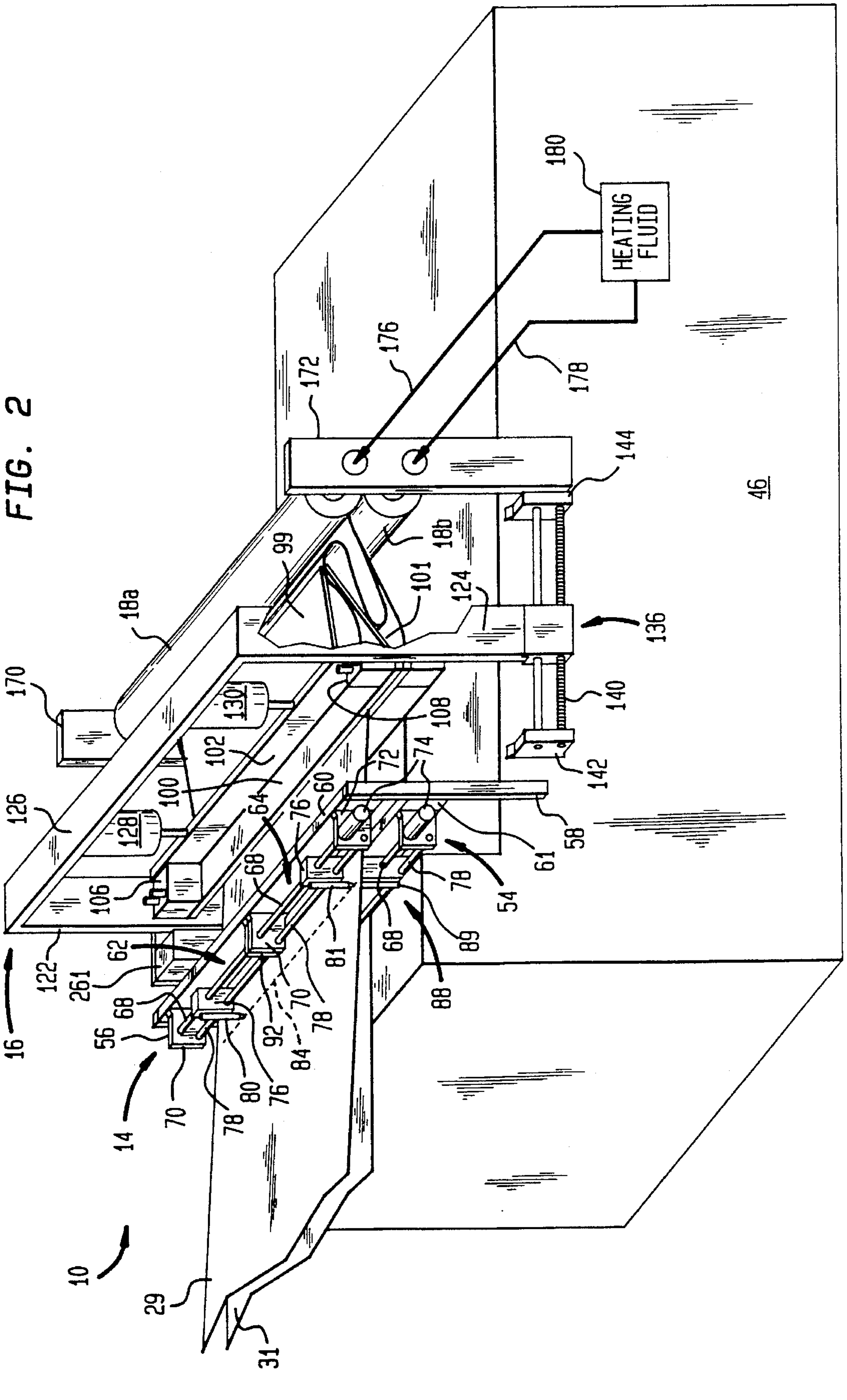
FIG. 2 is an enlarged view of a portion of FIG. 1 illustrating the adhesive applicator, pusher bar and folding rollers in greater detail.

Referring now to FIGS. 1 and 2, the apparatus 10 of this invention generally comprises two sheet feeding mechanisms 12*a* and 12*b*, an adhesive applicator unit 14, a pusher bar assembly 16, and, a pair of counter-rotating folding rollers 18*a* and 18*b*. The apparatus 10 is operative to form a window treatment article 20, as explained in more detail below. The following discussion will describe each of the system elements individually, followed by an explanation of the operation of apparatus 10 in forming the article.

Sheet Feed Mechanisms

The sheet feed mechanisms 12*a* and 12*b* depicted schematically in FIG. 1 form no part of this invention of themselves, and therefore the details of the operation of same are not provided herein. Such sheet feed mechanisms 12*a*, 12*b* are commercially available, and are presently utilized in other types of apparatus for forming expandable-collapsible articles.

For purposes of the present discussion, and with reference to FIG. 1, the two sheet feed mechanisms 12*a* and 12*b* include support stands 24*a*, *b* each having a drive roller 26. The drive roller 26 of support stand 24*a* mounts a web 28 of sheet material forming an upper sheet 29, and the support stand 24*b* of sheet feed mechanism 12*b* mounts a web 30 of sheet material forming a lower sheet 31. The terms "upper" and "lower" are meant to refer to the relative vertical orientation of the sheets 29, 31 in the positions depicted in the Figs. As described in more detail below, the sheets 29, 31 are advanced through the apparatus 10 one atop the other and are then interconnected to form the article 20.

The drive roller 26 of each support stand 24*a*, *b*, is drivingly connected to a DC drive 32, which, in turn, is connected by a line 34 to a drive controller 36. The operation of the drive controller 36 is controlled by a programmable system controller 38 such as a Catec Model PSQ-8 available from Custom Applied Technology Corporation of Sarasota, Fla., a dedicated computer or other suitable controller system. As described below, the system controller 38 controls all functions of the apparatus 10 and can be programmed to form articles 20 of different dimension.

The upper sheet 29 is unwound from web 28, fed around the roller 40 of a tensioner bar 42, and is then wrapped over a guide roller 44 from where the upper sheet 29 extends onto the frame 46 of apparatus 10. The lower sheet 31 from web 30 is fed in a similar manner to the frame 46, e.g. over the roller 48 of a tensioner bar 50, and then over a guide roller 52 to a position beneath the supper sheet 29.

Adhesive Applicator

Referring now to FIG. 2, the adhesive applicator 14 is illustrated in more detail. As described below, the adhesive applicator 14 is utilized to form the window treatment article 20, either alone or in combination with an ultrasonic welding unit described in more detail below. The adhesive applicator 14 is effective to apply longitudinally spaced beads of adhesive on both the top surface and bottom surface of upper sheet 29. The lower sheet 31 receives no adhesive. The terms "top" and "bottom" as used herein refer to relative vertical positions of the faces of upper sheet 29 as viewed in the Figs.

In the presently preferred embodiment, a mounting bracket 54 is provided having a pair of support legs 56, 58 each connected to one side of the frame 46, and an upper cross brace 60 extending between the support legs 56, 58 in a position above the frame 46 and upper sheets 29. The upper cross brace 60 mounts a first ball and screw mechanism 62 which extends from mounting leg 56 to the center of cross brace 60. A second ball and screw mechanism 64 is also mounted to the upper cross brace 60 so that it abuts the first ball and screw mechanism 62 and extends to the second mounting leg 58. The ball and screw mechanisms 62, 64 are preferably of the type such as sold under the system Model No. 2AC, under the name "Powerslide," by Thomson Industries, Inc. of Port Washington, N.Y.. Ball and screw mechanisms 62, 64 of this type include a rotatable, threaded shaft 68 which is mounted at opposite ends to bearings 70, 72. The threaded shaft 68 is rotated by a reversible motor 74, preferably carried by one of the housings for the bearings 70 or 72. A carriage 76 is movable along the threaded shaft 68 in response to the rotation thereof, and is slidable along one or more guide rods 78 extending between the bearing housings.

The ball and screw mechanisms 62, 64 mount adhesive dispensers 80 and 81, respectively, each having a nozzle disposed immediately above or in engagement with the top surface of upper sheet 29. The adhesive dispensers 80, 81, in turn, are connected to a source of hot melt adhesive or the like (not shown). In response to rotation of the threaded shaft 68 of first and second ball and screw mechanisms 62, 64, by operation of motors 74, the two adhesive dispensers 80 and 81 are movable toward the center of the upper support plate 60, from a position adjacent the mounting legs 56, 58 of bracket 54, thus forming an adhesive bead 84 which extends across the width of the top surface of upper sheet 29 as depicted in phantom lines in FIG. 2. When the upper sheet 29 is then advanced toward the pusher bar assembly 16 in a folding operation described below, the adhesive dispensers 80, 81 are moved by ball and screw mechanisms 62, 64 away from one another toward the mounting legs 56, 58, respectively, thus applying another adhesive bead (not shown) onto the top surface of upper sheet 29 at a longitudinally spaced location from the first adhesive bead 84. Consequently, a series of longitudinally spaced adhesive beads 84 are applied to the exposed top surface of the upper sheet 29 across the entire width thereof. The term "longitudinally" as used herein refers to the direction of movement of the sheet materials 29, 31 along frame 46, and the "transverse" or "perpendicular" direction refers to a direction perpendicular to the movement of the sheet materials 29, 31 along frame 46.

Similar structure is employed to apply an adhesive bead 86 to the bottom surface of the upper sheet 29. Third and fourth ball and screw mechanisms 88, one of which is shown in FIG. 2, are mounted to a lower cross brace 61 in position beneath the exposed, bottom surface of the upper sheet material 29. The lower cross brace 61 extends between and is mounted to the opposed legs 56, 58 of mounting bracket 54 in position beneath the upper cross brace 60. The ball and screw mechanisms 88 have the same structure as described above in connection with mechanisms 62, 64, and the same reference numbers are therefore employed to identify like structure. The carriages 76 of third and fourth ball and screw mechanisms 88 mount adhesive dispensers 89, one of which is shown in FIG. 2, in position beneath the bottom surface of upper sheet 29 such that the nozzle of each dispenser 89, contacts or nearly contacts such bottom surface. The adhesive dispensers 89 are moved toward and away from one another in the same manner as described above for dispensers 80, 81 associated with ball and screw mechanisms 62, 64 so that longitudinally spaced adhesive beads 86 are applied to the bottom surface of upper sheet 29 at selected locations therealong.

The upper sheet 29 is therefore transmitted to the pusher bar assembly 16 and folding rollers 18*a,* 18*b* with longitudinally spaced adhesive beads 84, 86 on the exposed top and bottom surfaces thereof. Operation of the reversible motors 74 associated with each of the ball and screw mechanisms 62, 64, and 88 is controlled by the system controller 38 to ensure that the adhesive beads 84 and 86 are applied at the correct intervals along the upper sheet 29, depending upon the dimensions of the window treatment article 20 to be formed, as described in more detail below.

In addition to the construction of the above-described adhesive applicator 14, it is contemplated that an alternative device could be employed to apply adhesive beads 84, 86 to the upper sheet 29. Preferably, an elongated first slot nozzle (not shown) is placed in a position immediately above the top surface of upper sheet 29, and a second slot nozzle (not shown) is placed beneath the upper sheet 29 in position to engage its bottom surface. Both slot nozzles are movable into engagement with the upper sheet 29 to lay down the adhesive beads 84, 86, respectively, across the entire width of the top and bottom surfaces in a single operation. Slot nozzles suitable for this purpose are commercially available from Nordson Corporation of Westlake, Ohio.

Pusher Bar Assembly

Figure 3:
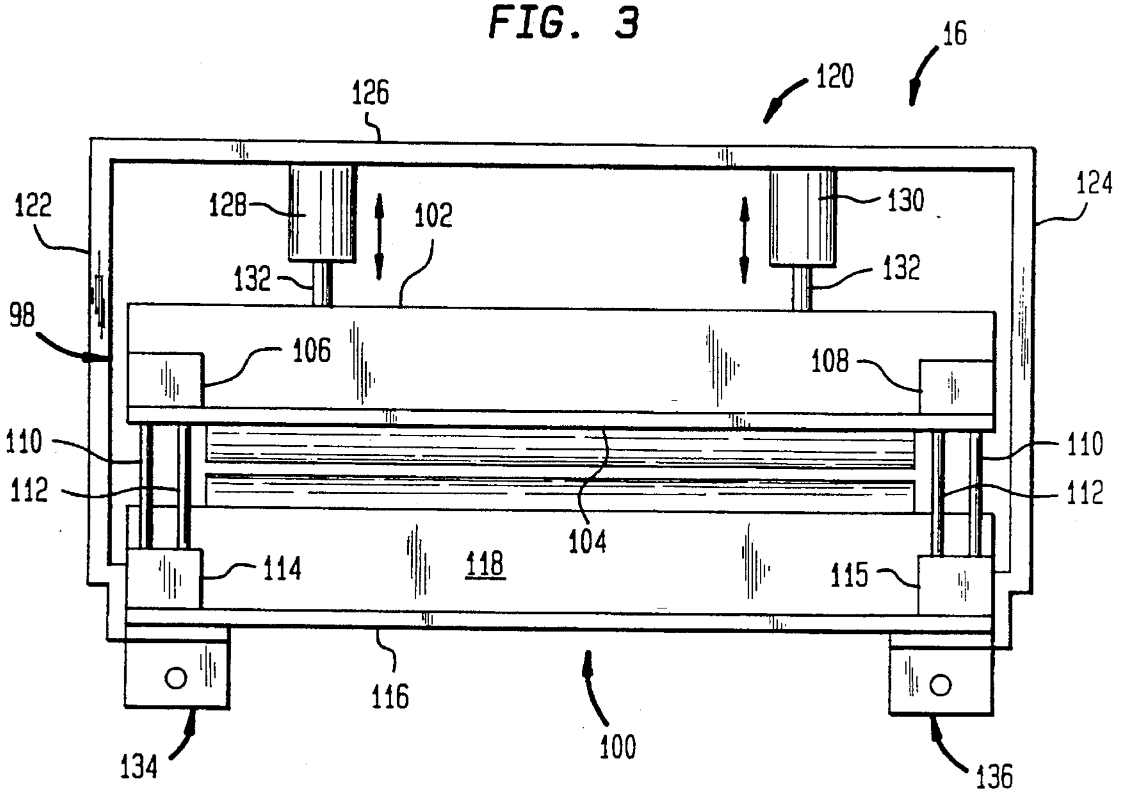
FIG. 3 is an enlarged, end view of the pusher bar herein.
Figure 4:
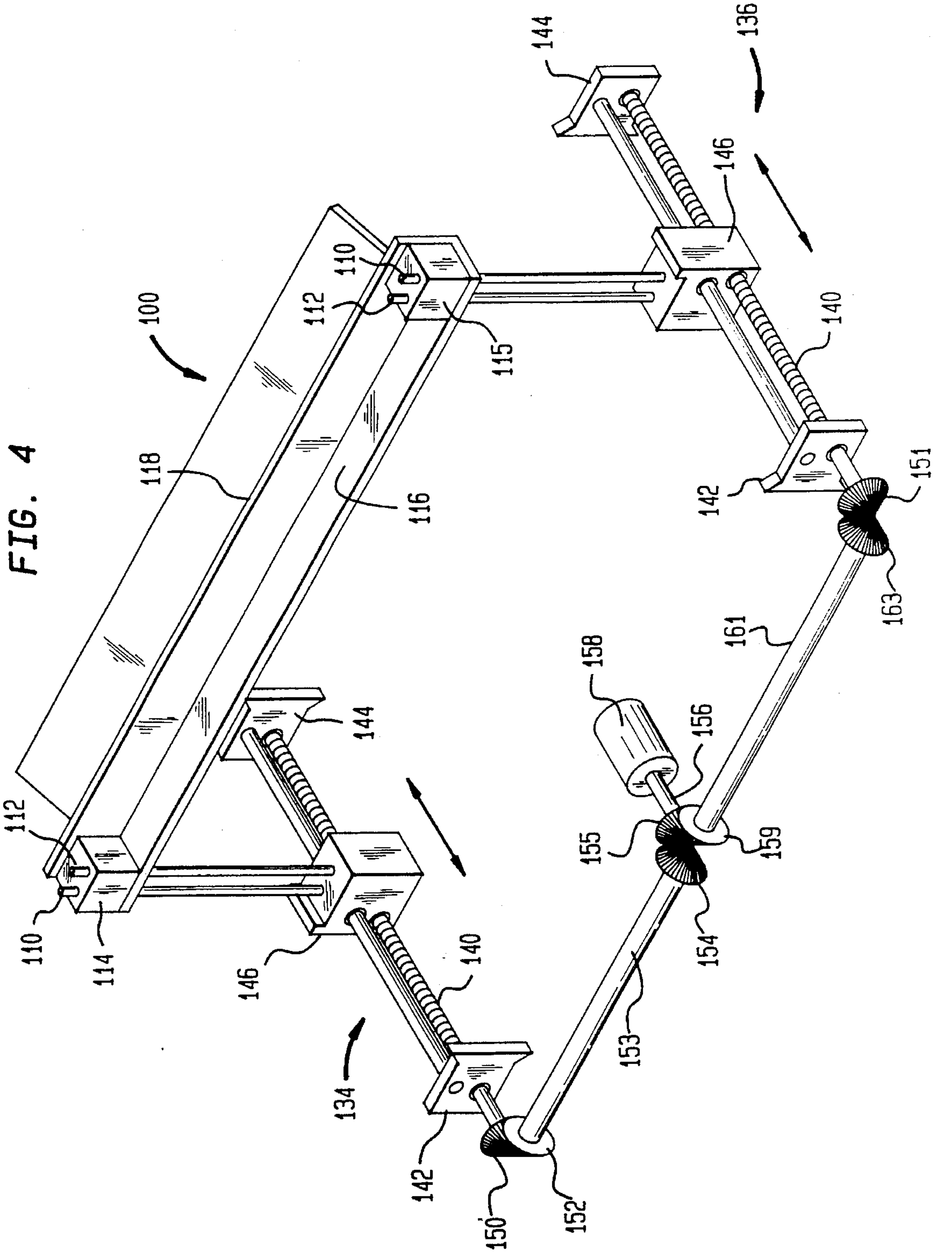
FIG. 4 is a schematic view in partial cross-section of the drive mechanism associated with the pusher bar.

With reference to FIGS. 2–4, the pusher bar assembly 16 is illustrated in detail. As described below in connection with a discussion of the operation of apparatus 10, the purpose of the pusher bar assembly 16 is to advance a selected length of the upper sheet 29 to the folding rollers 18*a,* 18*b* for folding therebetween. One advantage of the apparatus 10 of this invention is that the movement of the pusher bar assembly 16 is adjustable, i.e. it can be moved to essentially any number of starting or contact positions along the length of the upper sheet 29, and thus initiate successive folding operations at different, spaced positions with respect to the folding stripper rollers 18*a,* 18*b*.

In the presently preferred embodiment, the pusher bar assembly 16 comprises an upper gripper member 98, and a lower gripper member 100 which is located vertically beneath the upper gripper member 98. As best seen in FIGS. 2 and 3, the upper gripper member 98 is generally L-shaped having a vertical plate 102 connected to a horizontal plate 104 with guide blocks 106, 108 mounted on either side of the horizontal plate 104. These guide blocks 106, 108 each receive a pair of guide rods 110, 112 which extend downwardly therefrom to guide blocks 114, 115, respectively, mounted on the base plate 116 of lower gripper member 100. The base plate 116 is connected to a vertical plate 118, forming the same general L-shape as upper gripper member 98, and such vertical plate 118 is oriented in alignment with the vertical plate 102 of upper gripper member 98.

The upper gripper member 98 is supported in position above the lower gripper member 100 by a pair of hydraulic or pneumatic cylinders 128, 130 carried by the cross plate 126 of a mounting bracket 120 having opposed legs 122, 124 whose upper ends mount the cross plate 126. The lower ends of legs 122, 124, in turn, are connected to the base plate 116 and guide blocks 114, 115 associated with the lower gripper member 100. The cross plate 126 mounts the hydraulic or pneumatic cylinders 128, 130 in position such that the piston rod 132 of each cylinder 128, 130 connects to the vertical plate 102 of upper gripper member 98. The cylinders 128, 130 are operative to extend and retract their associated piston rods 132, which, in turn, moves the upper gripper member 98 toward and away from the lower gripper member 100. Such movement of the gripper members 98, 100 is guided by the guide rods 110, 112 extending therebetween so that in the extended position of piston rods 132, the vertical plate 102 of upper gripper member 98 engages the vertical plate 118 of lower gripper member 100 across substantially the entire width of the pusher bar assembly 16 and frame 46.

In the presently preferred embodiment, the upper gripper member 98 mounts an elongated, upper clamping arm 99 which extends downwardly at an angle therefrom, and the lower gripper member 100 mounts an opposed, elongated lower clamping arm 101 extending toward the upper clamping arm 99. The clamping arms 99, 101 are biased toward one another by spring elements 103, 105, respectively, so that the outermost tips of the clamping arms 99, 101 can engage one another. As discussed in more detail below in connection with an explanation of the operation of apparatus 10, movement of the upper and lower gripper members 98, 100 toward one another causes their clamping arms 99, 101 to temporarily clamp or grip the upper sheet 29 therebetween so that it can be moved to the folding rollers 18*a,* 18*b* in order to perform a folding operation. See also FIGS. 5A–5D.

Opposite ends of the lower gripper member 100 are mounted on a pair of adjustable linear actuators 134, 136, preferably of the type sold under Model No. RX 102B-12-

M55-MC by Industrial Devices Corporation of Novato, Calif. With reference to FIG. 4, each linear actuator 134, 136 includes a threaded shaft 140 carried by bearings 142, 144 at opposite ends, and having a carriage 146 movable between the bearings 142, 144 in response to rotation of the threaded shaft 140. The carriage 146 of each linear actuator 134, 136, in turn, is connected to the base plate 116 of lower gripper member 100, as shown in FIG. 3.

The threaded shaft 140 of linear actuators 134, 136 each mount a bevel gear 150, 151, respectively. Bevel gear 150 is drivingly connected to a bevel gear 152 mounted at one end of a shaft 153 whose opposite end carries a bevel gear 154 mounted in position to mesh with a drive gear 155 on the output shaft 156 of a stepper motor 158, preferably of the type sold under Model No. 583-135-MO by The Control Division of Parker Hannifan Corporation of Wadsworth, Ohio. The stepper motor 158 is mounted to the frame 46 approximately in the center thereof, e.g. midway along the lower gripper member 100, and is operated by a motor controller (not shown) connected to the system controller 38. The drive gear 155 on the output shaft 156 of stepper motor 158 also meshes with a bevel gear 159 carried at one end of a shaft 161. The opposite end of shaft 161 mounts a bevel gear 163, which, in turn, meshes with a bevel gear 151 on the shaft 140 of linear actuator 136. Preferably, each of the shafts 153 and 161 are rotatably supported by a bearing (not shown) at either end.

The output shaft 156 of stepper motor 158 is rotatable both in the clockwise and counter-clockwise directions to precisely control the rotation of the threaded shafts 140 associated with each linear actuator 134, 136 via the drive trains described above. The carriage 146 of each linear actuator 134, 136, and, hence, the lower gripper member 100, are therefore moved in an axial direction with respect to the threaded shafts 140 and longitudinally along the frame 46. Because the upper gripper member 98 is connected to the lower gripper member 100 by the mounting bracket 120, the entire pusher bar assembly 16 is moved toward and away from the folding rollers 18*a*, 18*b*, as a unit, in response to operation of the stepper motor 158.

The linear actuators 134, 136 are illustrated in the Figs. as ball and screw mechanisms capable of precise, and essentially infinitely adjustable, linear movement in response to operation of the stepper motor 158. It is contemplated that other "adjustable" linear actuators could be employed in this invention, such as hydraulic or pneumatic cylinders, so long as they have the capability of precisely locating and moving the upper and lower gripper members 98, 100 with respect to the folding rollers 18*a*, 18*b*. As described more fully below, an important aspect of this invention is predicated on the capability of apparatus 10 to selectively and precisely vary the spacing between the pusher bar assembly 16 and the folding rollers 18*a*, 18*b* by operation of the linear actuators 134, 136 so that a selected length of upper sheet 29 located between the pusher bar assembly 16 and folding rollers 18*a*, 18*b* can be folded to produce the window treatment article 20.

Folding Rollers

With references to FIGS. 1 and 2, the folding rollers 18*a*, 18*b* are each mounted at opposite ends to bearing blocks (not shown) which are carried in mounting brackets 170 and 172 affixed to opposite sides of the frame 46. One of the rollers 18*a* or 18*b* is drivingly connected to the output of a variable speed motor 174, e.g., lower roller 18*b* as depicted schematically in FIG. 1, which, in turn, is controlled by the controller 38 via line 175. In response to rotation of the lower folding roller 18*b*, the upper folding roller 18*a* is rotated in the opposite direction. The rollers 18*a*, 18*b* are maintained in contact with one another by brackets 170, 172 with a force which allows the passage of upper and lower sheets 29, 31 therebetween, and the formation of folds along upper sheet 29, as described below.

In the presently preferred embodiment, the folding rollers 18*a*, 18*b* are hollow and are formed of a thermally conductive material such as stainless steel or the like. The rollers 18*a*, 18*b* are connected by lines 176, 178, respectively, to a source 180 of heated fluid such as oil or the like. Alternatively, the rollers 18*a*, 18*b* can be provided with electric heating elements (not shown) to raise the temperature thereof. As described below, the function of rollers 18*a*, 18*b* is to form folds along the upper sheet 29, and to at least initially "tack" or interconnect the upper and lower sheets 29, 31 with the application of heat and pressure to the adhesive beads 84, 86.

In order to facilitate the folding of upper sheet 29, described below, the apparatus 10 further includes an upper guide plate 182 and a lower guide plate 184. See FIGS. 5A–5C. Preferably, the upper guide plate 182 is mounted by a pair of braces (not shown) each extending from one of the roller mounting brackets 170, 172, so that the upper guide plate 182 angles upwardly and outwardly from the nip 188 formed between the rollers 18*a*, 18*b*. The lower guide plate 184 is mounted in an essentially mirror image position beneath the upper guide plate 182 by a second pair of braces (not shown) also extending from the roller mounting brackets 170, 172. As shown in the Figs., the lower guide plate 184 thus extends at an angle downwardly and outwardly from the roller nip 188 so that both the upper and lower sheets 29, 31 are positioned between the upper and lower guide plates 182, 184 at least in the area of the roller nip 188.

Method of Operation

With reference now to FIGS. 5A–7, the method of formation and detailed construction of window treatment article 20 is depicted. As an overview, the objective is to form a window treatment article 20 or 20*a* having opposed, generally parallel extending surfaces or face sections 192, 194 which are spaced apart and interconnected by a number of transversely extending, longitudinally spaced vanes 196. As described below, each vane 196 is formed with first and second sides 198, 200 which are interconnected at an inner end along a fold line 212 and at an outer end by adhesive beads 84. As such, each vane 196 defines a transversely extending, elongated pocket 204 which can receive a slat 206 in a manner described below. For purposes of discussion, the term "inner" used herein to describe article 20 refers to the area adjacent the face section 194 and lower sheet 31 whereas "outer" refers to the opposite face section 192 of article 20.

Initially, longitudinally spaced adhesive beads 84 are applied to the top surface of upper sheet 29, and adhesive beads 86 are applied to the bottom face thereof in the manner described above. The controller 38 is effective to actuate the adhesive dispensers 80, 81, as well as the adhesive dispensers 89, to obtain the desired longitudinal spacing of adhesive beads 84, 86 along upper sheet 29, depending upon the desired dimensions of the vanes 196 in the finished window treatment article 20. As will become apparent below, one adhesive bead 84 affixes the outer end of each vane 196, and an adhesive bead 86 interconnects the inner end of each vane 196 to the lower sheet 31 which forms face section 194 of article 20.

Figure 5A:
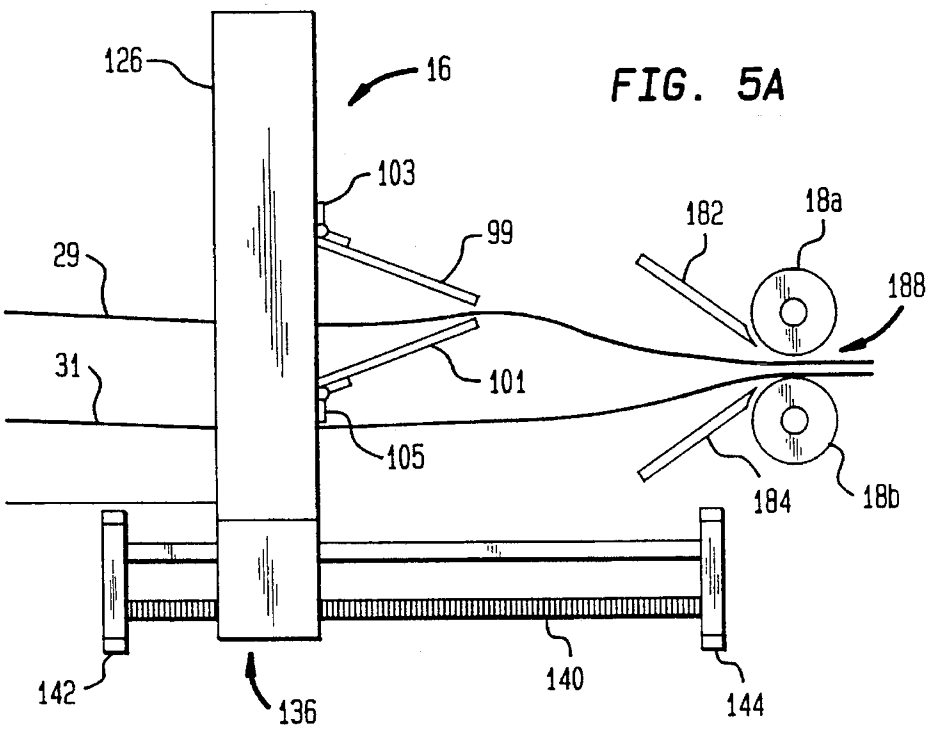
FIG. 5A is a schematic view of the pusher bar and folding rollers prior to a folding operation of the upper sheet wherein the pusher bar is located at the pick-up position.

Referring initially to FIG. 5A, the gripper bar assembly 16 is illustrated in a retracted or spaced position with respect to the folding rollers 18*a*, 18*b* in preparation for the initial stage of the folding operation. In the position depicted in FIG. 5A, the upper and lower gripper members 98, 100 have been moved toward one another in the manner described above so that their associated clamping arms 99, 101, respectively, engage the upper sheet 29 therebetween. As mentioned above, the upper and lower clamping arms 99, 101 are biased toward one another by operation of spring elements 103, 105, respectively, so that the outermost tips of the clamping arms 99, 101 can grip the upper sheet 29 with a force sufficient to advance it toward the folding rollers 18*a*, 18*b*. Because the upper and lower clamping arms 99, 101 are spring biased, a resiliency is provided upon gripping the upper sheet 29 so as not to tear or otherwise damage same when the clamping arms 99, 101 make engagement with the upper sheet 29 and/or move it toward the folding rollers 18*a*, 18*b*. It should be noted that the lower sheet 31 passes beneath the lower gripper member 100 and extends directly between the folding rollers 18*a*, 18*b*. The lower sheet 31 is neither folded nor does it receive adhesive.

Figure 5B:
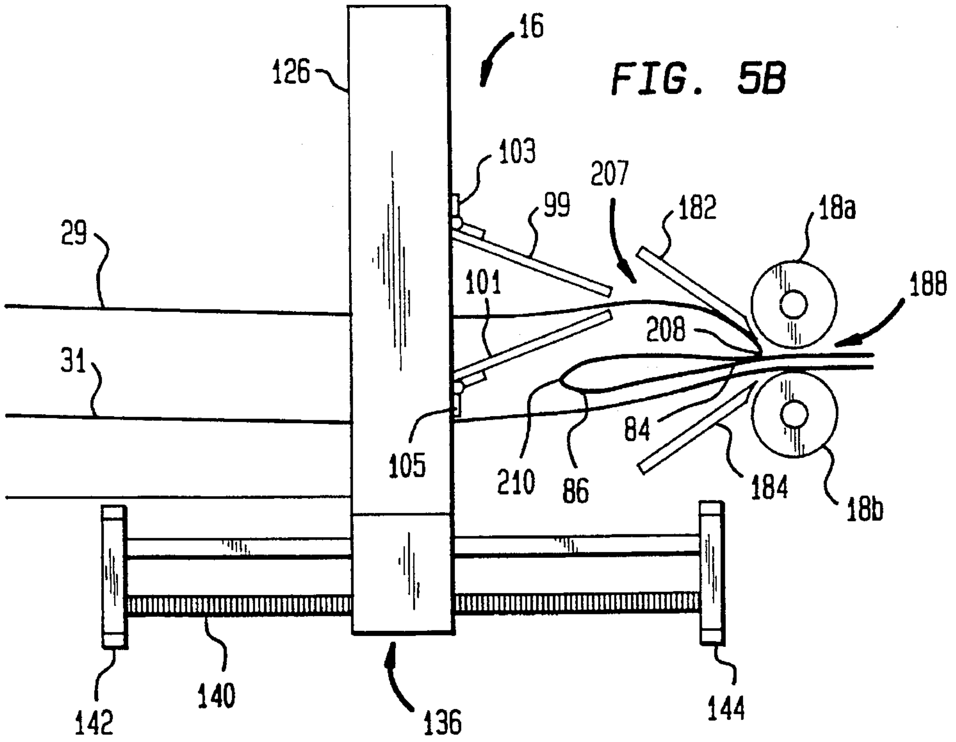
FIG. 5B is a schematic view similar to FIG. 5A except wherein the upper sheet is advanced to a release position at the folding rollers forming an inverted S shape in preparation for an initial folding operation.

As depicted in FIG. 5B, the next step in the forming operation is for the controller 38 to cause the upper and lower gripper members 98, 100 of pusher bar assembly 16 to move toward the folding rollers 18*a*, 18*b* in a manner described above. In the course of movement toward folding rollers 18*a*, 18*b*, that portion of the upper sheet 29 between the pusher bar assembly 16 and folding rollers 18*a*, 18*b* is looped over upon itself, thus forming the general shape of an inverted S. When viewed in a vertical plane as depicted in FIG. 5B, this first inverted S shape 207 forms a top bow or loop 208 and a bottom loop 210 which trails the top loop 208 in a right-to-left direction as viewed in FIG. 5B. Note the position of the adhesive bead 84 relative to the top loop 208, and the location of adhesive bead 86 with respect to the bottom loop 210. As the pusher bar assembly 16 continues to move toward the folding rollers 18*a*, 18*b*, the top loop 208 engages the upper guide plate 182 and is directed toward the nip 188 between folding rollers 18*a*, 18*b*. When the top loop 208 reaches the roller nip 188, the controller 38 activates motor 174 causing folding rollers 18*a*, 18*b* to rotate in opposite directions, thus drawing the top loop 208 therebetween. This forms the fold line 212 in the upper sheet 29 in the area of top loop portion 208 immediately adjacent one of the adhesive beads 84 which was previously applied to the top surface of upper sheet 29 in the adhesive application operation described above. Immediately after the folding rollers 18*a*, 18*b* engage and begin to fold the top loop 208 of upper sheet 29, the pusher bar assembly 16 is moved away from the folding rollers 18*a*, 18*b* while its upper and lower gripper members 98, 100 are separated from one another so that their associated clamping arms 99, 101 disengage upper sheet 29. Tension is maintained on upper and lower sheets 29, 31 because of their engagement between the folding rollers 18*a*, 18*b* while the pusher bar assembly 16 is retracted.

Figure 5C:
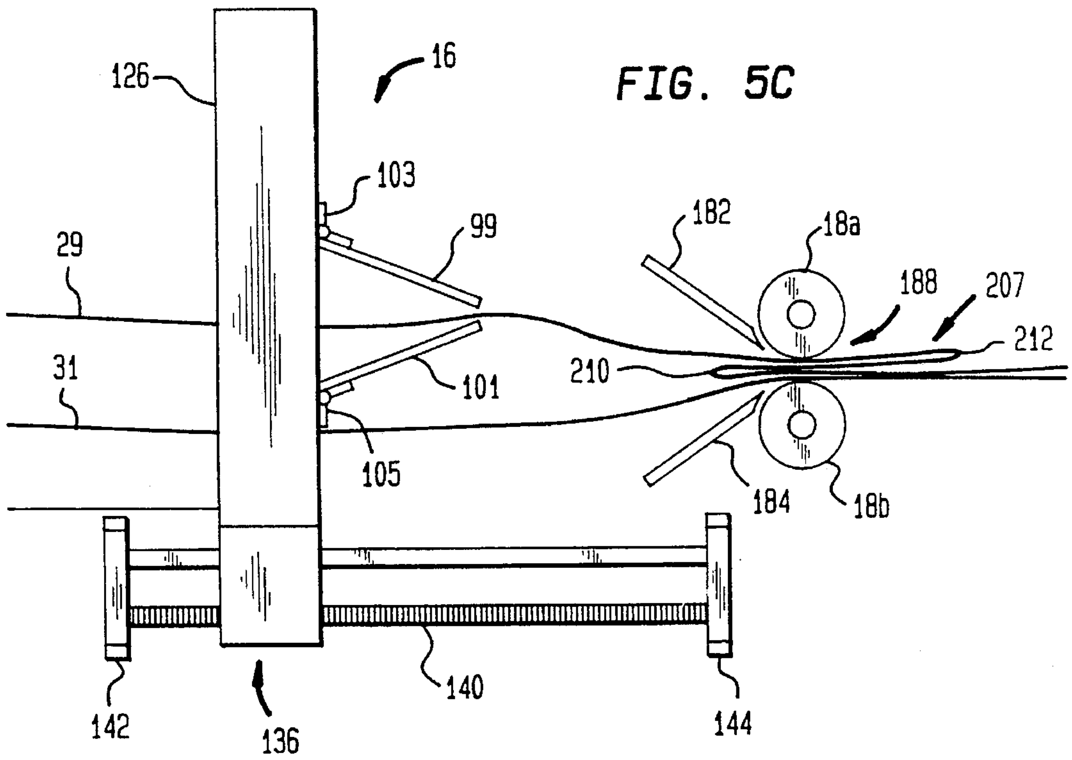
FIG. 5C is a view of the upper sheet being drawn through the folding rollers while the pusher bar is retracted upstream to engage the upper sheet.

As shown in FIG. 5C, the rollers 18*a*, 18*b* receive the top loop portion 208 of the first inverted S shape 207, form a fold line 212 thereat and continue to rotate while the pusher bar assembly 16 is retracted to a pick-up or contact position along upper sheet 29 spaced from folding rollers 18*a*, 18*b*. Both the upper and lower sheets 29, 31 are pulled forwardly by the rotating folding rollers 18*a*, 18*b*, i.e., from left to right as viewed in the Figs., until such time as the bottom loop 210 of the first inverted S shape 207 formed by pusher bar assembly 16 reaches a point immediately upstream from the nip 188 of folding rollers 18*a*, 18*b*. At that point, the rotation of folding rollers 18*a*, 18*b* is stopped by the controller 38 in preparation for further motion of the pusher bar assembly 16 as described below. With additional reference to FIGS. 6 and 7, that portion of the upper sheet 29 which is pulled through folding rollers 18*a*, 18*b* while the pusher bar assembly 16 is being retracted forms a connector section 214 in the finished window treatment article 20. A series of side-by-side connector sections 214, located between adjacent fold lines 212, define the second face section 192 of the completed window treatment article 20 or 20*a*. As described below, such face section 192 can either have an essentially uninterrupted or continuous appearance (article 20*a*), or a pleated look (article 20), depending upon where the fold lines 212 are formed along upper sheet 29.

At this point in the forming operation, an initial fold line 212 has been formed in upper sheet 29, the folding rollers 18*a*, 18*b* have been rotated to a sufficient extent to draw a section or length of the upper sheet 29 therethrough defined as the "connector section" 214, and, the bottom loop 210 of the initially formed first inverted S shape 207 in upper sheet 29 has been positioned immediately upstream from the nip 188 between rollers 18*a*, 18*b*.

Figure 5D:
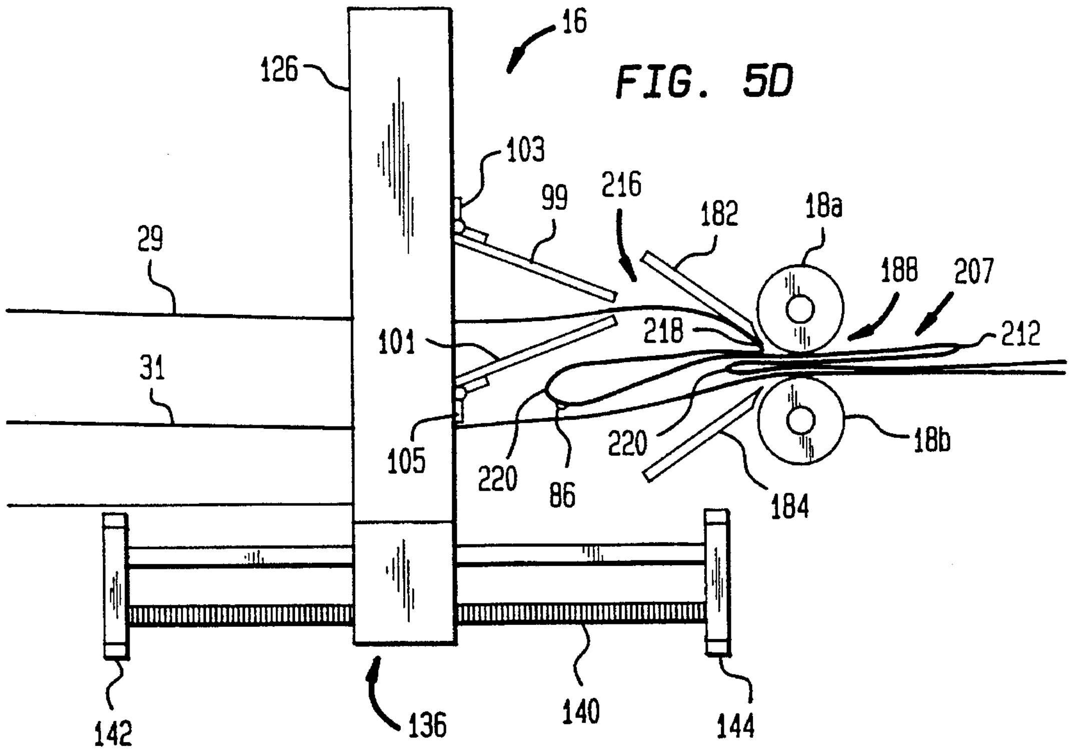
FIG. 5D is a view of the next step in the folding sequence wherein another inverted S shape is formed in the upper sheet.
Figure 6:
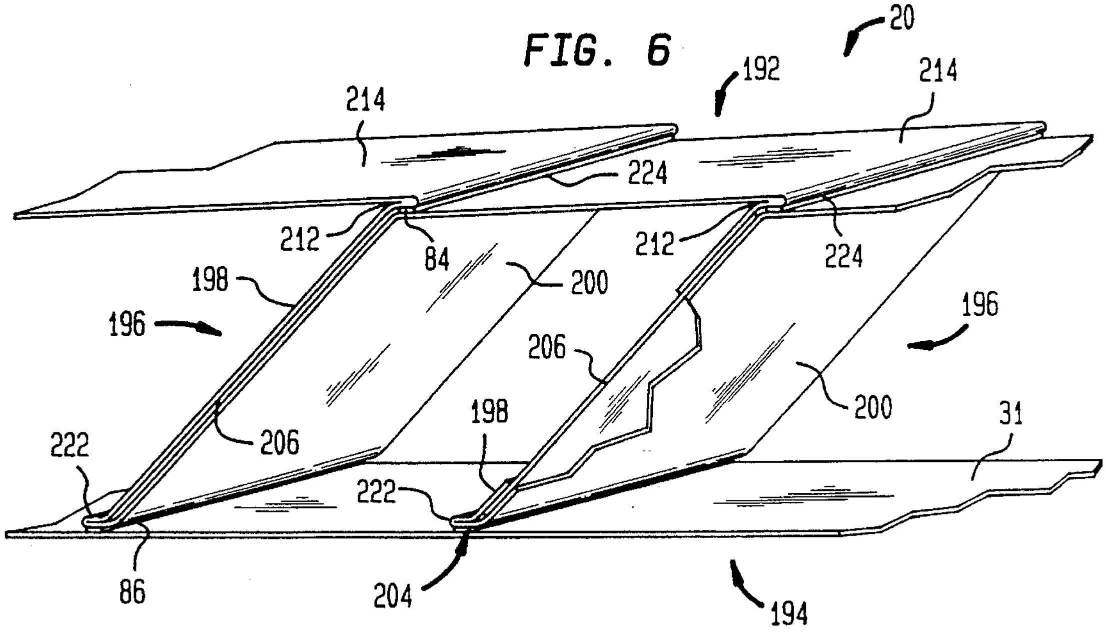
FIG. 6 is an enlarged, side view of one embodiment of the article made in accordance with the method and apparatus of this invention.
Figure 7:
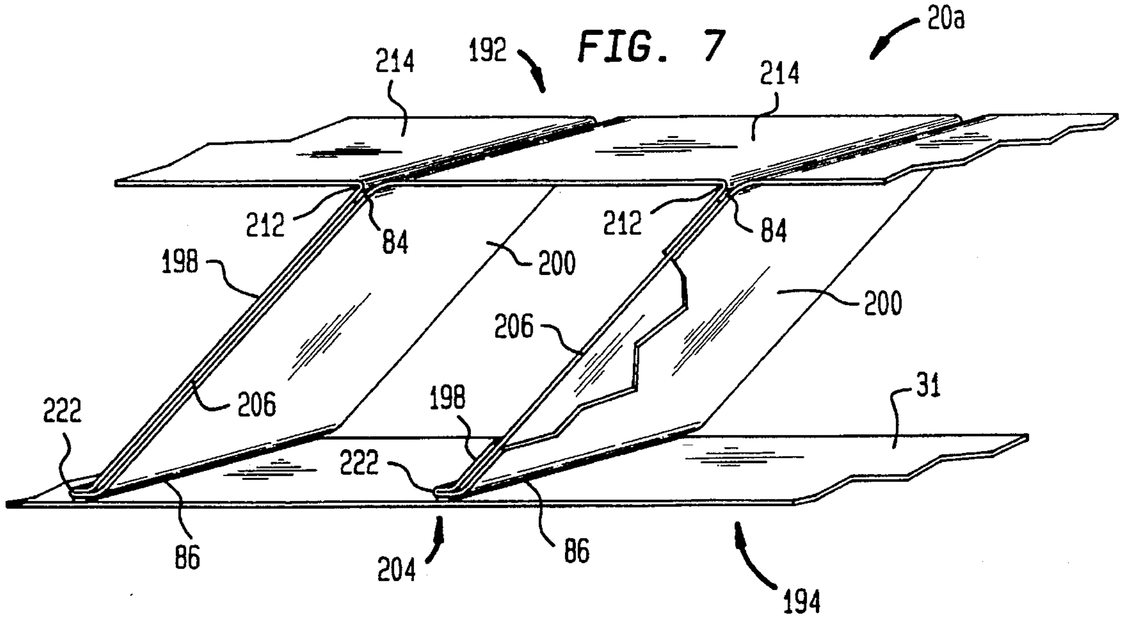
FIG. 7 is an enlarged, side view of an alternative embodiment of the article herein.

With reference to FIG. 5D, the next step in the forming operation is to form another inverted S shape along upper sheet 29 in the same manner described above. Initially, the upper and lower gripper members 98, 100 of gripper bar assembly 16 are moved toward one another allowing their clamping arms 99, 101 to grip the upper sheet 29 therebetween. The controller 38 then causes the linear actuators 134, 136 of pusher bar assembly 16 to move its upper and lower gripper members 98, 100 toward the folding rollers 18*a*, 18*b*, thus forming a second inverted S shape 216 having a top loop 218 and a bottom loop 220. The clamping arms 99, 101 advance the second inverted S shape 216 toward the roller nip 188 where the upper guide plate 182 assists in directing the top loop 218 of second inverted S shape 216 to the roller nip 188 in position immediately downstream from the lower loop 210 of the previously formed, first inverted S shape 207. When the top loop 218 contacts the roller nip 188, the controller 38 activates motor 176 to cause folding rollers 18*a*, 18*b* to rotate in opposite directions and pull the top loop 218 of second inverted S shape 216 therein. A fold line 212 is thus formed in top loop portion 218 of the second inserted S shape 216, and, at the same time or immediately thereafter, a fold line 222 is formed in the bottom loop 210 of the first inverted S shape 207. See also FIGS. 6 and 7. As such, when viewing the window treatment article 20 in a flattened condition, the fold lines 212, 222 are located very close to one another with the fold line 212 slightly leading the fold line 222 in the left-to-right direction depicted in the Figs. As explained above, once the folding rollers 18*a*, 18*b* have gripped the top loop portion 218 of inverted S shape 216 therebetween, the upper and lower gripper members of pusher bar assembly release the upper sheet 29 and the pusher bar assembly 16 is retracted in an upstream direction along the upper sheet 29 in preparation for another loop forming operation. Further, as also noted above, the folding rollers 18*a*, 18*b* continue to rotate while the pusher bar assembly 16 is retracted so as to draw a sufficient amount of the upper and lower sheets 29, 31 therebetween to form another connector section 214 along the upper sheet 29 between adjacent fold lines 212.

The foregoing discussion has centered on the manner in which fold lines 212 and 222 are formed along the upper sheet 29 by the cooperation between pusher bar assembly 16 and folding rollers 18*a*, 18*b*. To form the completed window treatment article 20, the upper sheet 29 must be affixed to the lower sheet 31 along adhesive beads 86, and the upper sheet 29 must be affixed to itself along adhesive beads 84. Both of these connecting operations are at least initially performed by the heated rollers 18*a*, 18*b* during the course of the initial folding operation. With reference to FIGS. 5C–7, when the top loop portion 208 of the first formed insert S shape 211 passes through the rollers 18*a*, 18*b*, the fold line 212 is formed adjacent one of the adhesive beads 84. The pressure exerted by the folding rollers 18*a*, 18*b* forces the upper sheet 29 in the area of such fold line 212 against an adjacent connector section 214 along the upper sheet 29. The connection between the upper sheet 29 at fold line 212 to a connector section 214 of upper sheet 29 forms the outer, closed portion of one of the vanes 196. See FIGS. 6 and 7. As noted above, each vane 196 comprises first and second sides 198, 200 which, as depicted in the Figs., is seen to be that portion of the upper sheet 29 located between adjacent fold lines 212 and 222. In other words, the portion of the upper sheet 29 which is folded over upon itself, i.e., along loops 208, 210 of inverted S shape 207 and along loops 218, 220 of the next inverted S shape 216, defines a vane 196 in the finished window treatment article 20 or 20*a*. The outer portion of each such vanes 196 is defined by fold line 212, whereas the inner portion thereof is defined by fold line 222. Each successive pair of adjacent fold lines 212 and 222 forms a separate vane 196 with first and second sides 198, 200.

The "outer" portion or end of each vane 196 is closed by affixing the upper sheet 29 to itself along each adhesive bead 84, i.e., by connecting fold line 212 to an adjacent connector section 214. In one embodiment of window treatment article 20 depicted in FIG. 6, the fold line 212 is formed such that an overlap or pleat 224 extends along a portion of the adjacent connector section 214 before the two are interconnected along adhesive bead 84. Alternatively, the window treatment article 20*a* shown in FIG. 7 has a fold line 212 formed along upper sheet 29 such that it abuts an adjacent connector section 214 along upper sheet 29 thus forming an essentially planar or continuous face section 192 in the completed window treatment article 20*a*. Consequently, in the FIG. 7 embodiment, the outer ends of first and second sides 198, 200 are connected to one another by adhesive bead 84 so that the fold line 212 is located in the same plane as adjacent connector sections 214.

In addition to forming the outer portion of each vane 196, passage of the upper and lower sheets 29, 31 between folding rollers 18*a*, 18*b*, interconnects the lower portion of each vane 196 to the lower sheet 31. Specifically, the fold line 222 formed in upper sheet 29 in the area of each of the bottom loops 210 and 220 of inverted S shapes 207, 216, respectively, defines the inner portion of each vane 196 where one of the adhesive beads 86 is located. In the course of movement through the folding rollers 18*a*, 18*b*, the inner portion of each vane 196 adjacent the fold line 222 is urged against the lower sheet 31 so that the adhesive bead 86 creates at least a temporary bond therebetween. Consequently, the lower sheet 31 is affixed to the inner portion of each vane 196 at the fold line 222 interconnecting the first and second sides 198, 200 thereof and forms the second side 194 of finished window treatment articles 20 and 20*a*.

With the vanes 196 secured to the first and second sides 192, 194 of article 20 or 20*a*, each pocket 204, noted above, is formed between the two sides 198, 200 of such vanes 196. Each pocket is shaped to receive a generally rectangular slat 206, preferably formed of plastic or lightweight metal which is insertable between the side sections 198, 200 from either end of the vanes 196 along the entire width of the sheets 29, 31. These slats 206 can be formed of different colors so that when the vanes 196 are moved to a closed position, generally parallel to the inner and outer faces 192, 194 of the article 20 or 20*a*, the color of the slats 206 carried by each vane 196 is visible from the front or back of the article. This provides a decorative look to the window treatment assembly formed with the articles 20, 20*a* of this invention, which can be readily changed by simply replacing the slats of one color with slats of another color. In this way, the overall color of the article of this invention can be altered to match different furnishings, wall-coverings, drapes or other changes in the appearance of a particular room without necessitating replacement of the entire window covering assembly. Additionally, the slats 206 add overall rigidity to the articles 20, 20*a* and can be employed to assist in raising and lowering them between a fully extended and fully retracted position.

In the presently preferred embodiment, commercially available hot melt adhesives are employed to form adhesive beads 84 and 86. Although folding rollers 18*a* and 18*b* contain heated oil or are otherwise elevated in temperature, such as by operation of electrical heating elements, the residence time of the upper and lower sheets 29, 31 therebetween is insufficient to create permanent bonds in the finished window treatment article 20. As a result, a heating and curing oven 226, depicted schematically in FIG. 1, is provided downstream from the folding rollers 18*a*, 18*b*. In this oven 226, sufficient heat, pressure and residence time is provided to permanently interconnect the upper sheet 29 to itself and to the lower sheet 31 in the areas of fold lines 212 and 222. The function of the folding rollers 18*a*, 18*b* is therefore to perform the folding operations noted above, and at least preliminarily interconnect the folded upper sheet 29 and the lower sheet 31 so that they are properly registered with respect to one another and maintained in the appropriate relative positions until they can be permanently attached within the oven 226.

One feature of the apparatus 10 of this invention which enhances its performance in the formation of articles 20 and 20*a* is the drive arrangement of the pusher bar assembly 16. As described above, linear actuators 134, 136 are provided to move the pusher bar assembly 16 between a pick-up or contact position spaced from the folding rollers 18*a*, 18*b*, and a drop-off or release position near the roller nip 188. It can be appreciated that in order to advance the appropriate length of upper sheet 29 toward the roller nip 188, and to form the loops 208, 210, 218 and 220 at the proper positions with respect to adhesive beads 84, 86, the pusher bar assembly 16 must be precisely located along upper sheet 29.

In the presently preferred embodiment, a sensor 240 is mounted to the pusher bar assembly 16, e.g., to side brace 122 thereof, and is movable relative to the folding rollers 18*a*, 18*b* with the pusher bar assembly 16. The purpose of sensor 240 is to detect the presence of a mark or indicia on the top surface of upper sheet 29, e.g., the longitudinally spaced adhesive beads 84, and transmit a signal to the controller 38 indicating such indicia has been sensed. The controller 38, in turn, controls the operation of motor 158 associated with the linear actuator 134, 136 so that the clamping arms 99, 101 of the gripper member 98, 100 engage the upper sheet 29 at the appropriate location relative to adhesive bead 84. This ensures that the loops 208 and 218 of inverted S shapes 207, 216 are formed at the proper positions with respect to adhesive bead 84. Although no separate sensing of the location of adhesive beads 86 is provided, that is not considered necessary because the controller 38 is effective to precisely control adhesive dispensers 80, 81 and 88 so that the lower adhesive beads 86 obtained from dispensers 88 are always applied to the upper sheet 29 at the proscribed interval from adhesive beads 84 applied by dispensers 80, 81.

One advantage of the aforementioned arrangement is that a measure of "correction" or re-registration can be provided in the event of an error in the positioning of adhesive beads 84, 86. Because the movement of the pusher bar assembly 16 is essentially infinitely adjustable by operation of linear actuators 134, 136, the controller 38 can alter the pick-up position where the clamping arms 99, 101 initially contact the upper sheet 29 dependent on the signal from sensor 240. As such, the relative position of fold lines 212 and beads 84, as well as fold lines 222 and adhesive beads 86, can be consistently maintained despite unforeseen errors or inaccuracies in the positioning of such beads 84, 86.

Another advantage of the construction and operation of pusher bar assembly 16 is that the dimensions of the completed window treatment articles 20 and 20*a* can be altered with a simple command in the software of controller 38. The pick-up or initial contact position where the clamping arms 99, 101 of pusher bar assembly 16 engage the upper sheet 29 is readily varied by controller 38 by operation of the motor 158 and linear actuators 134, 136 associated with pusher bar assembly 16. Variation of this pick-up or contact position controls the amount of material of upper sheet 29 which is folded upon itself to form successive inverted S shapes, which, in turn, increases or decreases the distance between inner and outer ends of each vane 196 compared to that shown in the Figs. The controller 38 controls the rotation of folding rollers 18*a*, 18*b* accordingly, so that the length of each connector section 214 between successive fold lines 212 corresponds to the length of the vanes 196. Consequently, the length dimension of both the vanes 196 and connector sections 214 can be readily varied, as desired.

While the invention has been described with reference to a preferred embodiment, it should be understood by those skilled in the art that various modifications may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An article for use in fabricating a window covering assembly, comprising:

a first sheet;

a second sheet having a longitudinal axis, said second sheet being formed with a number of longitudinally spaced vanes each having an inner end and an outer end, said second sheet being formed with a number of connector sections each located between the outer end of one vane and the outer end of an immediately adjacent vane;

each of said vanes being formed by folding a portion of said second sheet upon itself thus defining a first side and second side which are interconnected by a fold line along said inner end thereof, said inner end of each of said vanes being affixed to said first sheet proximate said fold line and said outer end of each said vanes being closed at a location proximate said connector sections;

said first and second sides of each vane extending substantially parallel to one another from said inner end to said outer end of each vane, and being provided with a space therebetween along at least a portion of the distance between said inner and outer ends of each vane.

2. The article of claim 1 in which said first side of each of said vanes is connected to one of said connector sections, and said second side thereof is connected to an immediately adjacent connector section.

3. The article of claim 1 in which said first and second sides of each said vanes are connected to each other at said outer end of said vanes.

4. The article of claim 3 in which said first and second sides of each said vanes are connected to one another so that adjacent connector sections are disposed in substantially the same plane.

5. The article of claim 3 in which said outer ends of said first and second sides of each said vanes are interconnected by a bead of adhesive.

6. The article of claim 1 in which said second side of each said vanes is longer than said first side thereof at said outer end of said vanes thus forming a pleat portion which overlaps an adjacent connector section, said pleat portion of each said vanes being affixed to said adjacent connector section to close said outer end of said vanes.

7. The article of claim 6 in which said pleat portion is affixed to said adjacent connector section with a bead of adhesive.

8. The article of claim 1 in which each of said vanes includes a second fold line at said outer end thereof formed between said second side of said vane and an adjacent connector section.

9. The article of claim 1 in which said inner end of each said vanes is connected to said first sheet by at least one bead of adhesive.

10. An article for use in fabricating a window covering assembly, comprising:

a first sheet;

a second sheet having a longitudinal axis, said second sheet being formed with a number of longitudinally spaced vanes each having an inner end and an outer end, said second sheet being formed with a connector section located between said outer ends of adjacent vanes;

each of said vanes being formed by folding a portion of said second sheet upon itself thus defining a first side and second side which are interconnected by a fold line along said inner end thereof and which extend substantially parallel to one another from said inner end to said outer end of said vane, said inner end of each of said vanes being affixed to said first sheet proximate said fold line and said outer end of each said vanes being closed at a location proximate said connector sections thereby forming a substantially closed pocket defining a space between said first and second sides which extends at least partially from said inner end to said outer end thereof;

a slat insertable within said space in each of said pockets formed between said first and second sides of each of said vanes.

11. The article of claim 10 in which each of said slats are substantially rectangular in shape and extend across the width of said first and second sheets.

12. The article of claim 10 in which said slats are of a different color than at least one of said first and second sheets.

13. The article of claim 10 in which each of said slats is removable from said pockets of said vanes and replaceable with another slat.

14. The article of claim 10 in which each of said slats is transparent.

15. The article of claim 10 in which said first side of each of said vanes is connected to one of said connector sections, and said second side thereof is connected to an immediately adjacent connector section.

16. The article of claim 10 in which said first and second sides of each said vanes are connected to each other at said outer end of said varies.

17. The article of claim 16 in which said first and second sides of each said vanes are connected to one another so that adjacent connector sections are disposed in substantially the same plane.

18. The article of claim 16 in which said outer ends of said first and second sides of each said vanes are interconnected by a bead of adhesive.

19. The article of claim 10 in which said second side of each said vanes is longer than said first side thereof at said outer end of said vanes thus forming a pleat portion which overlaps an adjacent connector section, said pleat portion of each said vanes being affixed to said adjacent connector section to close said outer end of said vanes.

20. The article of claim 19 in which said pleat portion is affixed to said adjacent connector section with a bead of adhesive.

21. The article of claim 10 in which each of said vanes includes a second fold line at said outer end thereof formed between said second side of said vane and an adjacent connector section.

22. The article of claim 10 in which said inner end of each said vanes is connected to said first sheet by at least one bead of adhesive.

23. An article for use in fabricating a window covering assembly, comprising:

a first sheet and a second sheet each having a width dimension and a longitudinal axis, said first and second sheets being spaced from one another;

a plurality of longitudinally spaced vanes extending between said first and second sheets, each of said vanes being formed with a first side having opposed first and second ends and a second side having opposed first and second ends, said first ends of said first and second sides being connected to one of said first and second sheets and said second ends of said first and second sides being connected to the other of said first and second sheet, said first and second sides of each said vanes extending substantially parallel to one another between said first and second sheets;

each of said vanes forming a pocket along the width of said first and second sheets defining a space between said first and second sides thereof, said space within each of said pockets extending at least partially between said first and second ends of said sides;

a slat insertable within said space in said pocket of each said vanes.

24. The article of claim 23 in which each of said slats are substantially rectangular in shape and extend across said width dimension of said first and second sheets.

25. The article of claim 23 in which said slats are of a different color than at least one of said first and second sheets.

26. The article of claim 23 in which each of said slats is removable from said pockets of said vanes and replaceable with another slat.

27. The article of claim 23 in which each of said slats is transparent.

28. The article of claim 23 in which said first sheet is defined by a continuous sheet of material, and said second sheet is defined by a plurality of connector sections located between and affixed to said spaced vanes.

29. An article for use in fabricating a window covering assembly, comprising:

a first sheet;

a second sheet having a longitudinal axis, said second sheet being formed with a number of longitudinally spaced vanes each having an inner end and an outer end, said second sheet being formed with a number of connector sections each located between the outer end of one vane and the outer end of an immediately adjacent vane;

each of said vanes being formed by folding a portion of said second sheet upon itself thus defining a first side and a second side which are interconnected by a fold line along said inner end thereof, said inner end of each of said vanes being affixed to said first sheet proximate said fold line;

said second side of each said vanes being longer than the first side thereof at said outer end of said vanes thus forming a pleat portion which overlaps an adjacent connector section, said pleat portion of each said vanes being affixed to said adjacent connector section to close said outer end of each said vanes.

30. The article of claim 29 in which said pleat portion is affixed to said adjacent connector section with a bead of adhesive.

* * * * *

US005558925C1

(12) REEXAMINATION CERTIFICATE (4670th)

United States Patent

Fritzman

(10) Number: US 5,558,925 C1

(45) Certificate Issued: Nov. 12, 2002

(54) WINDOW TREATMENT ARTICLE

(75) Inventor: Ralph Fritzman, Sarasota, FL (US)

(73) Assignee: Cellular Designs Unlimited, Inc., Sarasota, FL (US)

Reexamination Request:
No. 90/005,748, Jun. 14, 2000

Reexamination Certificate for:

| | |
|---|---|
| Patent No.: | **5,558,925** |
| Issued: | **Sep. 24, 1996** |
| Appl. No.: | **08/388,270** |
| Filed: | **Feb. 13, 1995** |

(21) Appl. No.: 08/388,270

(51) Int. Cl.$^7$ .............................. B32B 3/28; E06B 9/26; A47H 5/00

(52) U.S. Cl. ........................ 428/181; 428/121; 428/176; 428/178; 428/188; 428/34; 428/192; 428/120; 428/130; 428/174; 428/198; 428/116; 428/118; 156/308.7; 156/302; 156/107; 156/109; 160/166.1; 160/84.01; 160/84.06; 160/89; 160/900; 160/168.1 R; 160/236

(58) Field of Search .......................... 428/34, 192, 181, 428/120, 121, 130, 174, 176, 178, 188, 198, 116, 118; 156/308.2, 302, 107, 109; 160/166.1, 84.01, 84.06, 89, 900, 168.1 R, 236

(56) References Cited

U.S. PATENT DOCUMENTS

| | | | | |
|---|---|---|---|---|
| 1,937,342 A | | 11/1933 | Higbie | 88/60 |
| 2,074,482 A | * | 3/1937 | Martens | 160/236 |
| 5,490,553 A | * | 2/1996 | Colson et al. | 160/84.06 |
| 5,603,369 A | * | 2/1997 | Colson et al. | 160/84.06 |

* cited by examiner

*Primary Examiner*—William P. Watkins, III

(57) ABSTRACT

A method and apparatus is provided for forming a window treatment article having opposed upper and lower sheets interconnected by transversely oriented, longitudinally spaced vanes comprising a pair of counter-rotating folding rollers oriented with respect to one another to form a nip therebetween, and a pusher bar assembly which is operative to successively advance a portion of the upper sheet into the nip between the folding rollers where it is folded and brought into contact with a lower sheet. The upper sheet is successively folded upon itself to form a number of transversely-extending, longitudinally-spaced vanes each having a fold line defining an inner end which is affixed to the lower sheet, and an opposite, outer end which is closed by adhesive attachment, an ultrasonic weld or other means of attachment, thus defining an essentially closed pocket having opposed sides within which a rectangular slat can be removably inserted to add overall rigidity to the finished article and to provide a decorative effect.

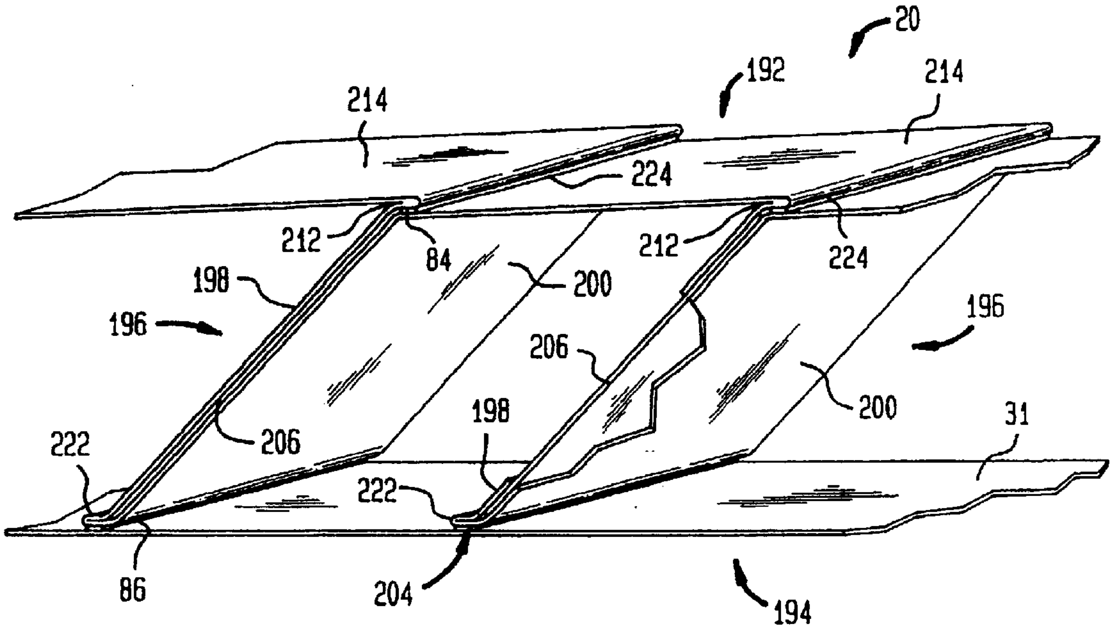

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6–7, 19–20 and 29–30 is confirmed.

Claims 1–5, 8–18 and 21–28 are cancelled.

* * * * *